(12) United States Patent
Kwak et al.

(10) Patent No.: US 10,177,590 B2
(45) Date of Patent: Jan. 8, 2019

(54) ELECTRONIC DEVICE HAVING AUXILIARY BATTERY EMBEDDED THEREIN AND METHOD OF CHARGING AUXILIARY BATTERY

(71) Applicant: SAMSUNG ELECTRONICS CO., LTD., Suwon-si, Gyeonggi-do (KR)

(72) Inventors: Hyun-Suk Kwak, Seoul (KR); Myung-Sik Kim, Suwon-si (KR); Young-Chul Ko, Suwon-si (KR); Chang-Yeong Kim, Seoul (KR); June-Hee Lee, Seongnam-si (KR); So-Won Kim, Goyang-si (KR); Yang-Wook Kim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 68 days.

(21) Appl. No.: 14/991,029

(22) Filed: Jan. 8, 2016

(65) Prior Publication Data

US 2016/0204640 A1 Jul. 14, 2016

(30) Foreign Application Priority Data

Jan. 9, 2015 (KR) .................. 10-2015-0003582

(51) Int. Cl.
*H02J 7/00* (2006.01)
*H04B 1/3883* (2015.01)
(Continued)

(52) U.S. Cl.
CPC .......... *H02J 7/0091* (2013.01); *H02J 7/0045* (2013.01); *H04B 1/3883* (2013.01);
(Continued)

(58) Field of Classification Search
CPC .. H02J 7/0091; H02J 7/0045; H04M 1/72519; H04M 1/0262; H04B 1/3883; Y02B 60/50; H04W 52/0296
See application file for complete search history.

(56) References Cited

U.S. PATENT DOCUMENTS 6,160,702 A 12/2000 Lee et al.
6,265,847 B1 * 7/2001 Goerke ................. H02J 7/0073
320/126

(Continued)

FOREIGN PATENT DOCUMENTS

EP 1881392 A1 * 1/2008 ........... G06F 1/1626
WO WO 2014006619 A1 * 1/2014 ........... H02J 7/0054

*Primary Examiner* — Kamran Afshar
*Assistant Examiner* — Minjung Kim
(74) *Attorney, Agent, or Firm* — Nixon & Vanderhye P.C.

(57) ABSTRACT

An electronic device is provided including: a display for displaying a UI element; a processor for processing an application; a Printed Board Assembly (PBA) having the processor mounted thereon, and arranged to be substantially parallel to the display; a main battery which supplies power to the electronic device, and is rechargeable and detachable; an auxiliary battery for supplying power to the electronic device; a first frame which houses the main battery, fixes the PBA, and is arranged to be substantially parallel to the display; a second frame for fixing the display and the first frame; and a cover coupled to the second frame, wherein the first frame includes a hole for housing the auxiliary battery, and the electronic device can receive power supplied from the auxiliary battery when power supply from the main battery is terminated.

19 Claims, 15 Drawing Sheets

(51) Int. Cl.
*H04M 1/02* (2006.01)
*H04M 1/725* (2006.01)
*H04W 52/02* (2009.01)

(52) U.S. Cl.
CPC ..... *H04M 1/0262* (2013.01); *H04M 1/72519* (2013.01); *H04W 52/0296* (2013.01); *Y02B 60/50* (2013.01); *Y02D 70/00* (2018.01)

(56) References Cited

U.S. PATENT DOCUMENTS

| | | | | |
|---|---|---|---|---|
| 6,286,109 | B1* | 9/2001 | Pirdy | G06F 1/203 |
| | | | | 320/106 |
| 8,958,854 | B1* | 2/2015 | Morley | H04M 1/72563 |
| | | | | 370/311 |
| 9,819,844 | B2* | 11/2017 | Akimoto | H04N 5/2252 |
| 2003/0093995 | A1* | 5/2003 | Tadayon | F01K 3/185 |
| | | | | 60/651 |
| 2007/0037053 | A1* | 2/2007 | Anantharaman | H01M 2/02 |
| | | | | 429/176 |
| 2012/0192001 | A1* | 7/2012 | Sutardja | G06F 1/1616 |
| | | | | 713/323 |
| 2012/0249058 | A1* | 10/2012 | Kuraishi | H02J 7/0016 |
| | | | | 320/107 |
| 2012/0262442 | A1* | 10/2012 | Hong | G09G 3/3406 |
| | | | | 345/212 |
| 2012/0322431 | A1 | 12/2012 | Kil et al. | |
| 2013/0308282 | A1* | 11/2013 | Shin | H05K 7/14 |
| | | | | 361/749 |
| 2013/0314030 | A1* | 11/2013 | Fathollahi | H02J 7/0045 |
| | | | | 320/107 |
| 2014/0361747 | A1* | 12/2014 | Bouyssou | H01M 10/443 |
| | | | | 320/128 |

* cited by examiner

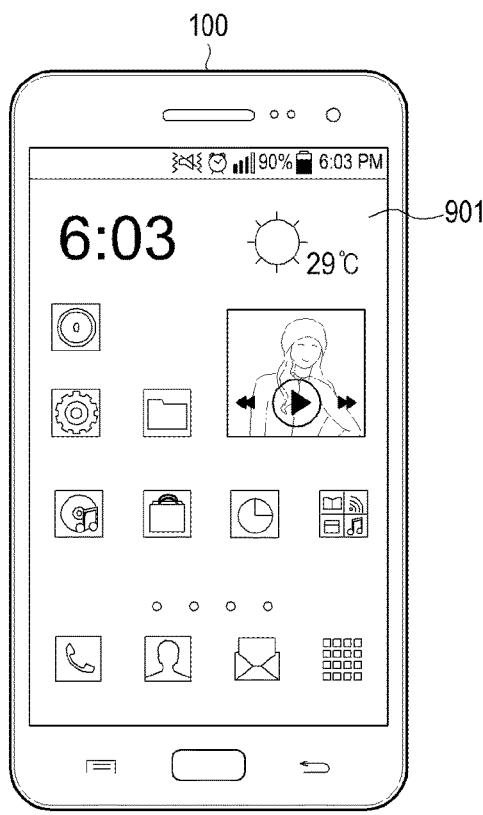
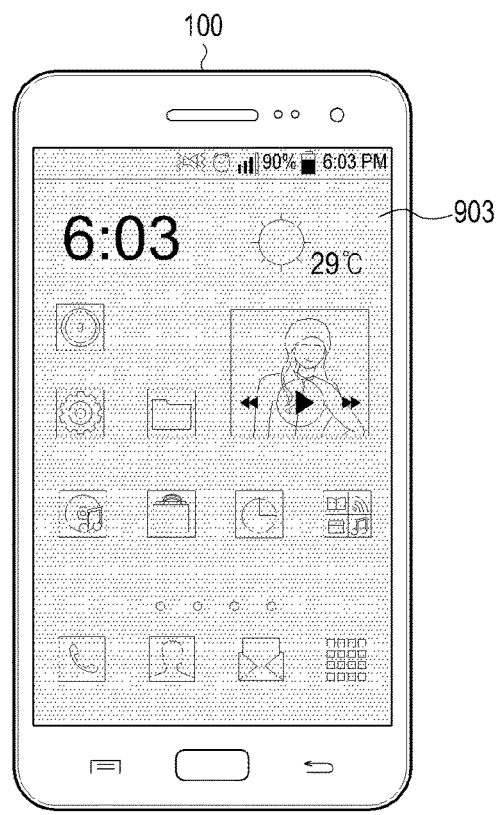
FIG.9A  FIG.9B
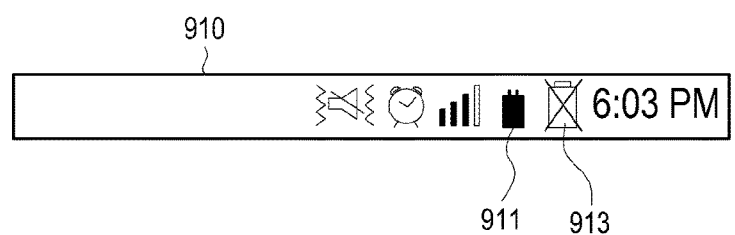
FIG.9C

ELECTRONIC DEVICE HAVING AUXILIARY BATTERY EMBEDDED THEREIN AND METHOD OF CHARGING AUXILIARY BATTERY

CROSS-REFERENCE TO RELATED APPLICATION

This application is based on and claims priority under 35 U.S.C. § 119 to Korean Application Serial No. 10-2015-0003582 which was filed in the Korean Intellectual Property Office on Jan. 9, 2015, the content of which is incorporated by reference herein in its entirety.

TECHNICAL FIELD

The disclosure relates generally to an electronic device having an auxiliary battery embedded therein and a method of charging an auxiliary battery. For example, the disclosure relates to a structure for mounting an auxiliary battery without increasing the thickness of an electronic device and a method of charging an auxiliary battery on the basis of the temperature of a processor.

BACKGROUND

Electronic devices, which are recently commercialized, have a smaller size in order to achieve convenience of portability, and have various functions. Since such electronic devices perform various functions such as Internet searching, a camera function, video reproduction, and music reproduction, as well as a voice call function, power consumption thereof is increased. Further, batteries thereof should be frequently replaced as a detachable battery is used. However, power of the electronic devices should be inevitably switched off when the batteries thereof are replaced and the electronic device should be rebooted after the batteries thereof are replaced, so that a user cannot help feeling inconvenience. In order to solve the above-described problems, a technology of using an auxiliary battery has developed. However, the size and the thickness of the electronic device are increased due to the use of the auxiliary battery, and the auxiliary battery is used regardless of the intention of a user.

SUMMARY

Various embodiments of the disclosure have been conceived to address the above-described problems, and an aspect of the disclosure is to provide a structure for mounting an auxiliary battery, and a method of charging an auxiliary battery. For example, another aspect of the disclosure is to provide various user interfaces for changing an outer appearance of an electronic device as an auxiliary battery is mounted without increasing the thickness thereof, and using the auxiliary battery.

An electronic device according to various example embodiments of the disclosure includes: a display configured to display a UI element; a processor configured to process or execute an application; a Printed Board Assembly (PBA) having the processor mounted thereon, and arranged to be substantially parallel to the display; a main battery configured to supply power to the electronic device, said main battery being rechargeable and detachable; an auxiliary battery configured to supply power to the electronic device; a first frame configured to house the main battery, to fix the PBA, and being arranged to be substantially parallel to the display; a second frame configured to fix the display and the first frame; and a cover coupled to the second frame. The first frame includes a hole for housing the auxiliary battery, and the electronic device can receive power supplied from the auxiliary battery when power supply from the main battery is terminated or when a predetermined unusual occurrence is detected. For example, the auxiliary battery can be in contact with the processor through a heat transfer member. For example, the shape of the hole formed in the first frame may be substantially the same as the shape of the auxiliary battery.

Further, the auxiliary battery can be in direct contact with the processor. The auxiliary battery may have a thickness substantially the same as the thickness of the first frame. The auxiliary battery may have a thickness thicker than the thickness of the first frame. The auxiliary battery is rechargeable and can be charged through the main battery and an external electronic device.

The electronic device according to various example embodiments of the disclosure can charge the auxiliary battery on the basis of the temperature of the processor. Further, the electronic device may charge the auxiliary battery when the temperature of the processor is lower than a predetermined value, and may not charge the auxiliary battery when the temperature of the processor is higher than the predetermined value. The electronic device can emit heat generated by the processor, through the auxiliary battery. For example, the auxiliary battery can be subjected to a surface treatment having a high thermal conductivity.

The electronic device may be configured to display a UI element corresponding to the auxiliary battery, on the display, and supply power from the auxiliary battery to the PBA in response to a touch input corresponding to the UI element. A UI element, which may be provided to select at least one of the main battery and the auxiliary battery, can be displayed on the display. The electronic device can display, on the display, a UI element may provide a notification indicating use of the auxiliary battery when the auxiliary battery is used.

The electronic device can display the UI element displayed on the display, in black-and-white when the auxiliary battery is used.

An electronic device according to various example embodiments of the disclosure includes: a display configured to display a UI element; a processor configured to process or execute an application; a Printed Board Assembly (PBA) having the processor mounted thereon, and being arranged to be substantially parallel to the display; a main battery configured to supply power to the PBA, and said main battery being rechargeable and detachable; an auxiliary battery configured to supply power to the PBA; a first frame configured to house the main battery, to fix the PBA, and being arranged to be substantially parallel to the display; a second frame configured to fix the display and the first frame; and a cover coupled to the second frame. The second frame includes a hole configured to house the auxiliary battery, and the electronic device can receive power supplied from the auxiliary battery when power supply from the main battery is terminated. The shape of the hole formed in the second frame may be substantially the same as the shape of the auxiliary battery.

A method of charging an auxiliary battery of an electronic device according to various example embodiments of the disclosure may include: detecting a temperature of a processor; and determining whether the auxiliary battery is charged based on the temperature of the processor. In the determination step, the auxiliary battery may be charged when the temperature of the processor is lower than a predetermined value, and the auxiliary battery may not be charged when the temperature of the processor is higher than the predetermined value.

In an electronic device having an auxiliary battery embedded therein and a method of controlling power of the electronic device according to various example embodiments of the disclosure, an auxiliary battery may be inserted into a hole included in the PBA, so that the auxiliary battery can be mounted without increasing the thickness of the electronic device. Because heat generated by the processor is emitted to the auxiliary battery, it is further possible to make heat dissipation efficient.

The temperature of the processor is checked and the auxiliary battery is charged based on the temperature of the processor, so that it is further possible to prevent the internal temperature of the electronic device from increasing and/or reduce the increase in the internal temperature of the electronic device.

BRIEF DESCRIPTION OF THE DRAWINGS

The above and other aspects, features, and advantages of the disclosure will be more apparent from the following detailed description, taken in conjunction with the accompanying drawings, in which like reference numerals refer to like elements, and wherein:

FIGS. 9A to 9D are diagrams illustrating example UI elements displayed on a display unit when an auxiliary battery is used;

DETAILED DESCRIPTION

Figure 1:
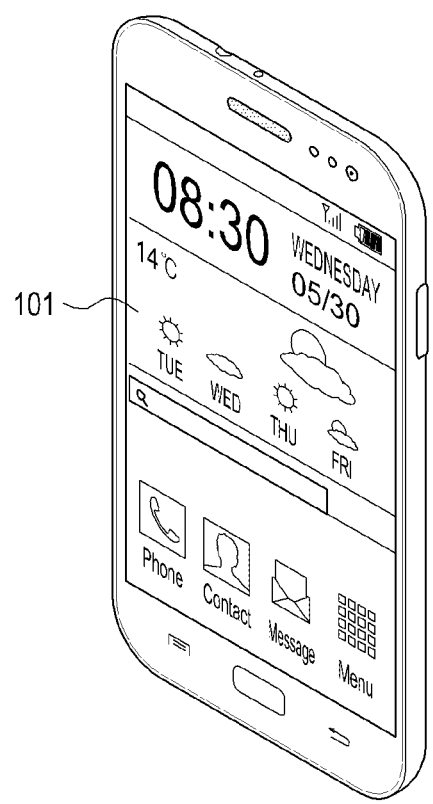
FIG. 1 is a perspective view illustrating an example front surface of an example electronic device.

Hereinafter, the disclosure will be described with reference to the accompanying drawings. The disclosure may have various example embodiments, and modifications and changes may be made therein. Therefore, the disclosure will be described in conjunction with example embodiments illustrated in the accompanying drawings. However, it should be understood that there is no intent to limit the disclosure to the particular forms disclosed herein; rather, the disclosure should be construed to cover all modifications, equivalents, and/or alternatives falling within the spirit and scope of the disclosure. In the description of the drawings, identical or similar reference numerals are used to designate identical or similar elements.

In the disclosure, the expression "include" or "may include" refers, for example, to existence of a corresponding function, operation, or element, and does not limit one or more additional functions, operations, or elements. In the disclosure, the terms such as "include" and/or "have" may be construed to denote a certain characteristic, number, step, operation, constituent element, element or a combination thereof, but may not be construed to exclude the existence of or a possibility of addition of one or more other characteristics, numbers, steps, operations, constituent elements, elements or combinations thereof.

In the disclosure, the expression "or" includes any or all combinations of words enumerated together. For example, the expression "A or B" may include A, may include B, or may include both A and B.

In the disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the disclosure.

In the case where an element is referred to as being "connected" or "accessed" to other elements, it should be understood that the element may be directly connected or accessed to the other elements, or that another element may exist between them. On the other hand, when an element is referred to as being "directly coupled" or "directly connected" to any other element, it should be understood that no element is interposed therebetween.

The terms used in the disclosure are only used to describe various example embodiments, and are not intended to limit the disclosure. As used herein, the singular forms are intended to include the plural forms as well, unless the context clearly indicates otherwise.

Unless defined otherwise, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the disclosure.

In example embodiments of the disclosure, the term "module" or "unit" may perform at least one function or operation, and may be implemented by hardware (e.g., circuitry), software, or a combination of hardware and software. Further, a plurality of "modules" or "units" may be integrated into at least one module and be implemented as at least one processor (not shown), except for "modules" or "units" that need to be implemented by specific hardware.

An application implies or may refer, for example, to software which is executed on an Operating System (OS) for a computer or a mobile OS, and is used by a user. For example, the application may include a word processor, a spreadsheet, a contact application, a calendar application, a memo application, an alarm application, a Social Network Service (SNS) application, a chatting application, a map application, a music player, or a video player, etc. In the disclosure, the application may imply software executed by an electronic device and a wearable device (e.g., a smart watch, etc.) connected wirelessly or by wire to the electronic device. The application according to an example embodiment of the disclosure may imply or refer to software executed by the electronic device in response to a received input, e.g., a user input.

In the following descriptions of the example embodiments of the disclosure, the term "substantially" is used to mean that a referred characteristic, parameter or value needs not be correctly achieved and a tolerance, a measurement error, a deviation or variation including an error in measurement accuracy and other factors known to a person skilled in the art may occur to an extent that does not exclude an effect intended to provide by related features.

Hereinafter, example embodiments of the disclosure will be described in greater detail with reference to the accompanying drawings, and in the description with reference to the accompanying drawings, the same or corresponding components have the same reference numeral, and a duplicate description therefor may be omitted.

Figure 2:
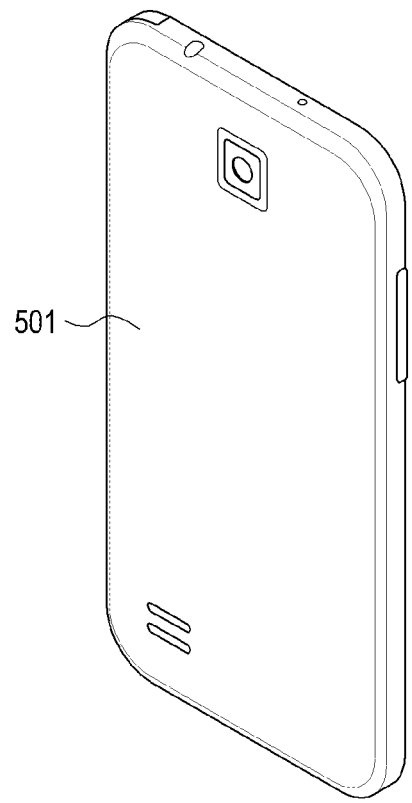
FIG. 2 is a perspective view illustrating a rear surface of an example electronic device.

FIG. 1 is a perspective view illustrating a front surface of an example electronic device. FIG. 2 is a perspective view illustrating a rear surface of an example electronic device. The electronic device may, for example, be a smartphone or a tablet Personal Computer (PC), or the like. Referring to FIGS. 1 and 2, a configuration of the electronic device such as a smartphone will be described. A display unit (e.g., including a display) 101 is arranged at a central portion of the front surface of the electronic device. The display unit 101 may be a touch screen on which a touch can be detected. The display unit 101 may be formed to occupy most of the front surface of the electronic device. FIG. 1 illustrates an example in which a main home screen is displayed on the display unit 101. The main home screen may be a first screen displayed on the display unit when the electronic device is powered on. When the electronic device has a plurality of pages of different home screens, a main home screen may be a first home screen from among the plurality of pages of home screens. Short-cut icons for executing frequently used applications, a main menu switching key, time, weather, etc. can be displayed on the main home screen. For example, a UI element may be displayed on the home screen. A main menu switching key allows a menu screen to be displayed on the display unit 101. A status bar for displaying states such as a battery charging state, the intensity of a reception signal, or a current time may be formed at an upper end of the display unit 101. A home button, a menu button, and a back button may be formed at a lower portion of the display unit 101.

The home button allows the main home screen to be displayed on the display unit 101. For example, in a state in which a home screen different from the main home screen or a menu screen is displayed on the display unit 101, when the home button is touched, the main home screen will be displayed on the display unit 101 in response to the home button being activated. When the home button is touched on the display unit 101 while applications are executed, the main home screen may be displayed on the display unit 101. The home button may be used to allow recently-used applications to be displayed on the display unit 101 or to allow a task manager to be displayed on the display unit 101. The menu button provides a connection menu which may be used on the display unit 101. The connection menu may include, for example, a widget addition menu, a background switching menu, a search menu, an editing menu, an environment setting menu, etc. The back button can allow a screen executed shortly before a currently-executed screen to be displayed or the most recently-used application to be terminated.

A first camera, an illuminance sensor, and a proximity sensor may be arranged at an upper portion of the front surface of the electronic device. A second camera, a flash, and a speaker may be arranged on the rear surface of the electronic device. When the electronic device is configured such that a battery thereof is detachable, the rear surface of the electronic device may include, for example, a detachable battery cover 501.

Since an electronic device, which will be described below, is configured to be detachable, the battery cover 501 is configured to have a structure coupled to and escaping from the electronic device. With reference to the drawings, a configuration of an electronic device having an auxiliary battery 307 mounted thereon and a method of utilizing the auxiliary battery 307 of the electronic device according to various example embodiments of the disclosure will be described.

Figure 3:
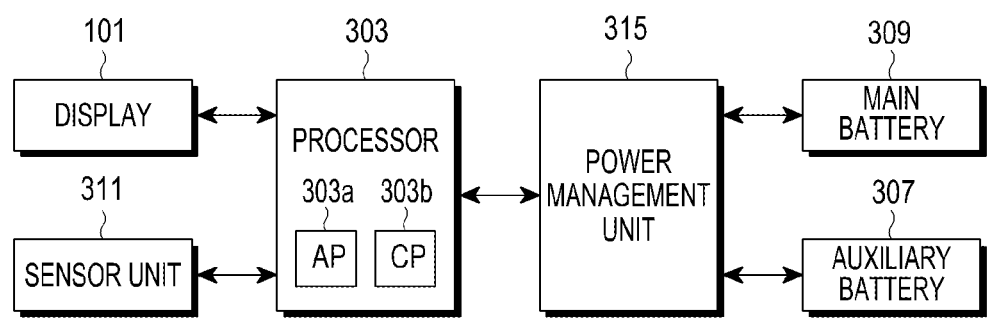
FIG. 3 is a block diagram illustrating an example electronic device.

FIG. 3 is a block diagram illustrating an example electronic device. Referring to FIG. 3, a processor (e.g., including processing circuitry) 303 may include one or more Application Processors (APs) 303*a* and/or one or more Communication Processors (CPs) 303*b*. The AP 303*a* may, for example, be a processor that may be configured to control a plurality of hardware or software components connected to the AP 303*a* by driving an operating system or an application program, the AP 303*a* may be configured to process and calculate various types of data including multimedia data, and may be implemented as, for example, a System on Chip (SoC). The AP 303*a* may further include a Graphic Processing Unit (GPU) (not illustrated) according to example embodiments.

The CP 303*b*, which may, for example, include a processor capable of being configured to perform a communication function of the electronic device, can be implemented in, for example, an SoC. The CP 303*b* may be configured to perform at least some multimedia control functions. The CP 303*b* may be configured to identify and authenticate the electronic device within a communication network using a subscriber identity module such as a Subscriber Identity Module (SIM) card, and to provide services such as voice call, video call, a text message, and packet data, etc. The CP 303*b* may be configured to control data transmission/reception of an RF unit (not illustrated).

The RF unit is in charge of data transmission/reception, for example, transmission/reception of an RF signal or an electronic signal. Although not illustrated, the RF unit may include, for example, a transceiver, a Power Amp Module (PAM), a frequency filter, a Low Noise Amplifier (LNA) and the like. The RF module may further include a component for transmitting/receiving electronic waves over a free air space in wireless communication, for example, a conductor, a conducting wire or the like.

The power management unit 315 may be configured to manage power of the electronic device. Although not illustrated, the power management unit 315 may include, for example, a Power Management Integrated Circuit (PMIC), a charger Integrated Circuit (IC), or a battery gauge, or the like. The PMIC may be mounted to, for example, an integrated circuit or an SoC semiconductor. Charging methods may be classified into a wired charging method and a wireless charging method. The charger IC may charge a main battery 309 and an auxiliary battery 307 and prevent and/or reduce introduction of overvoltage or overcurrent from a charger. The charger IC may include a charger IC for at least one of the wired charging method and the wireless charging method. A magnetic resonance scheme, a magnetic induction scheme, or an electromagnetic scheme may be examples the wireless charging method, and an additional circuit for wireless charging, such as a coil loop, a resonance circuit, a rectifier, and the like may be added. The battery gauge may be configured to measure at least one of residual amounts of the main battery 309 and the auxiliary battery 307, and a voltage, a current, and a temperature during charging. The main battery 309 and the auxiliary battery 307 may be configured to generate electricity to supply power and may be, for example, rechargeable batteries.

The display unit (e.g., including a display) 101, which is an apparatus for displaying an image or data, may be, for example, a Liquid Crystal Display (LCD), an Active Matrix Organic Light Emitting Diode (AM-OLED) display, and the like. The display unit 101 may include, for example, a touch screen panel (not illustrated). The touch screen panel may be configured to recognize a touch input using at least one scheme from among, for example, a capacitive scheme, a resistive scheme, an infrared scheme, and an ultrasonic scheme, or the like. The touch screen panel may further include a controller (not illustrated). In a case of the capacitive type touch panel, proximity recognition as well as a direct touch is possible. The touch screen panel may further include a tactile layer. The touch screen panel may provide a user with a tactile reaction.

A sensor unit (e.g., including at least one sensor) 311 may include an acceleration sensor and a gravity sensor, and may be configured to detect falling of the electronic device.

Names of the above-described components of the electronic device according to the disclosure may be changed according to the type of the electronic device, and the electronic device according to the disclosure may include at least one of the above-described components. Some components of the electronic device may be omitted or the electronic device may further include another additional component(s).

The main battery 309 may supply power to the electronic device, and may have a charging capacity relatively larger than that of the auxiliary battery 307 so as to be used as a main power supply source of the electronic device. The main battery 309 may be exchanged detachably.

The auxiliary battery 307 may supply power to the electronic device, and may have a charging capacity and a volume relatively smaller than those of the main battery 309. The auxiliary battery 307 can be used as an auxiliary power supply source of the electronic device. When the detachable main battery 309 is separated from the electronic device, the auxiliary battery 307 can be used for supplying power, so that it may be preferable that the auxiliary battery 307 is mounted to the electronic device in an embedded form. For example, the auxiliary battery 307 may be soldered or fixed not to be separated from the electronic device even when the electronic device falls and the cover 501 is separated therefrom. The auxiliary battery 307 may be fixed to the electronic device not to be separated from the electronic device even when a shock is applied to the electronic device.

Figure 4:
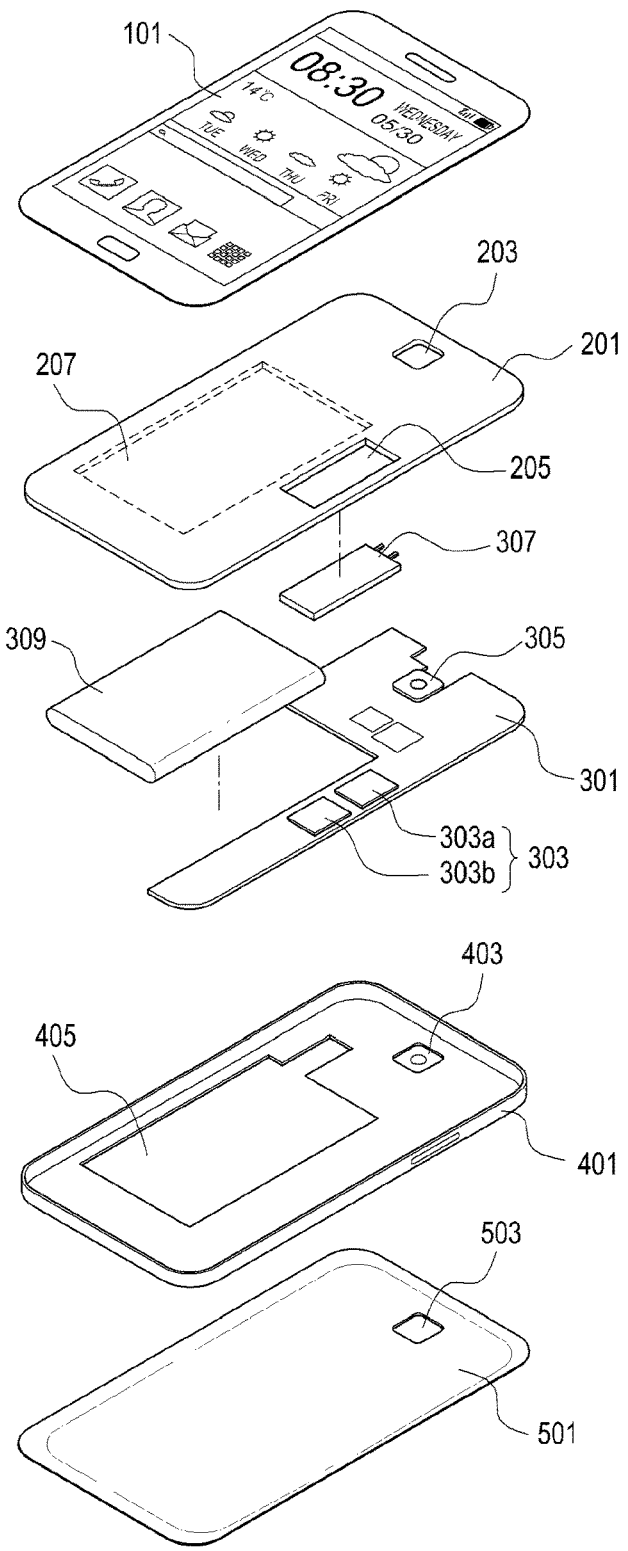
FIG. 4 is an exploded perspective view illustrating an example electronic device.

FIG. 4 is an exploded perspective view illustrating an example electronic device. Referring to FIG. 4, the display unit 101, the processor 303, the first frame 201, the auxiliary battery 307, the main battery 309, the PBA 301, the second frame 401, and the cover 501 are illustrated.

The display unit 101 may include, for example, a display that can display a UI element. The UI element may be a graphic object which provides an interface to enable an interaction between a user and the electronic device. The user may, for example, input a command to the electronic device through the UI element displayed on the display unit 101, and receive feedback as a result of processing the command from the electronic device. When the display unit 101 includes a touch screen panel, the user can input a desired input by touching the UI element displayed on the display unit 101. Although not illustrated, a heat dissipation sheet may be arranged on the rear surface of the display unit 101. The heat dissipation sheet can be arranged to be parallel to the display unit 101, and may be configured to efficiently diffuse heat generated by components of the electronic device or discharge the heat to the outside. For example, the APs included in the processor 303a generate a lot of heat during operation, and can be connected to the heat dissipation sheet in order to discharge or diffuse the generated heat to the outside. The heat dissipation sheet may include, for example, one or more of natural graphite particles, exfoliated graphite particles, artificial graphite particles, copper, graphene particles, CNT, and graphene hybrid, or the like.

The first frame 201 may be arranged to be parallel to the display unit 101, and may include holes 203 and 205, the main battery 309, and a reception part 207. The first frame 201 may fix electronic components having volumes, such as a microphone (not illustrated) and a camera module 305. The first frame 201 may include a screw groove capable of fixing the PBA 301. The first frame 201 may be configured of a metal material. The main battery reception part 207 may be configured by forming a protrusion on one surface of the first frame 201, and support the main battery 309 to cause the main battery 309 to be fixed without moving when the main battery 308 is mounted. The reception part 207 of the first frame 201 may have a shape similar to the main battery 309. The holes 203 and 205 may, for example, have a quadrangular shape. The hole 203 may be configured, for example, to fix a camera module. The hole 203 may have a shape similar to the camera module. The hole 205 may be configured to fix the auxiliary battery 307. The hole 205 may have a shape similar to the auxiliary battery 307. When the auxiliary battery 307 is mounted on or in the hole 205, the auxiliary battery 307 is fixed to the hole 205 while being inserted into the hole 205. A structure in which the auxiliary battery 307 is mounted on or in the hole 205 will be described in greater detail below with reference to FIG. 5.

The PBA 301 is a board on which various components may be mounted on a Printed Circuit Board (PCB). The PBA 301 may, for example, be arranged to be parallel to the display unit 101. The processor 303, the camera module 305, and various other types of electronic components may be mounted on the PBA 301, and may be electrically connected to each other through, for example, printed wiring. The processor 303 may include APs 303a and CPs 303b. The PBA 301 may be fixed to the first frame 201. The processor 303 may be a main heat source. The processor 303 mounted on the PBA 301 may, for example, be arranged at a location corresponding to the auxiliary battery 307 mounted to the first frame 201. For example, when the PBA 301 is fixed to the first frame 201, the processor 303 may, for example, be in direct contact with the auxiliary battery 307 or may, for example, be in contact with or coupled to the auxiliary battery 307 through a heat transfer member. The heat generated by the processor 303 can be discharged or diffused to the heat dissipation sheet through the auxiliary battery 307.

The main battery 309 may be configured to supply power to the PBA 301, and may be rechargeable and detachable.

The auxiliary battery 307 may supply power to the PBA 301. The thickness of the auxiliary battery 307 may, for example, be substantially the same as the thickness of the first frame 201. The auxiliary battery 307 may be inserted into the hole 205 of the first frame, and thus, may be mounted without increasing or without substantially increasing the thickness of the electronic device. For example, in order to prevent the thickness of the electronic device from increasing and/or reduce an increase in thickness of the electronic device due to the mounting of the auxiliary battery 307, the auxiliary battery 307 may be mounted in or on the hole 205 formed in the first frame 201. In the auxiliary battery 307, in order to efficiently discharge or diffuse the heat generated by the processor 303, one surface of the auxiliary battery 307 may be in contact with the heat dissipation sheet, and the other surface thereof may be in contact with the processor 303. The auxiliary battery 307 may be subjected to the surface treatment with a material having a high thermal conductivity. The heat transfer member may be inserted between the auxiliary battery and the processor in order to efficiently discharge the heat of the processor. The auxiliary battery 307 may be rechargeable and may be charged through the main battery and an external electronic device.

The second frame 401 may, for example, be arranged in parallel to the display unit 101. A hole 405, through which the main battery 309 can pass, may be formed in the second frame 401. The second frame 401 may, for example, include a groove 403 capable of housing the camera module, and a transparent window (not illustrated) for protecting the camera module. The second frame 401 may, for example, be arranged to be parallel to the display unit 101, the first frame 201, and the PBA 301. The second frame 401 may fix the display unit 101, the first frame 201, and the PBA 301. The second frame 401 may house the display unit 101, the first frame 201, and the PBA 301.

The second frame 401 may, for example, include a hole (not illustrated) for housing the auxiliary battery 307. The auxiliary battery 307 may be mounted to the first frame 201, or may be mounted to the second frame 401. Even when the auxiliary battery 307 is mounted to the second frame 410, the processor 303 may be in direct contact with the auxiliary battery 307 mounted to the second frame 401, or may be coupled to the auxiliary battery 307 through the heat transfer member.

The cover 501 may be coupled to the first frame 201, and may cause the main battery 309 not to deviate from the outside of the electronic device.

The electronic device may include, for example, the display unit 101, the processor 303, the first frame 201, the auxiliary battery 307, the main battery 309, the PBA 301, the second frame 401, and the cover 501. The electronic device may receive power supplied from the auxiliary battery 307 when the power supply from the main battery 309 is terminated or is in a predetermined state. When the electronic device falls, the sensor unit 311 may detect the falling, and the processor 303 may be configured to determine whether the electronic device falls, by receiving a signal output from the sensor unit 311. When it is determined that the electronic device falls, the processor 303 may be configured to control the electronic device to receive power supplied from the auxiliary battery 307. When the electronic device falls, the cover 501 and the main battery 309 may be separated from each other due to a shock. The processor 303 may be configured to control the electronic device to receive power supplied from the auxiliary battery 307 before the main battery 309 is potentially separated from the electronic device.

Figure 5A:
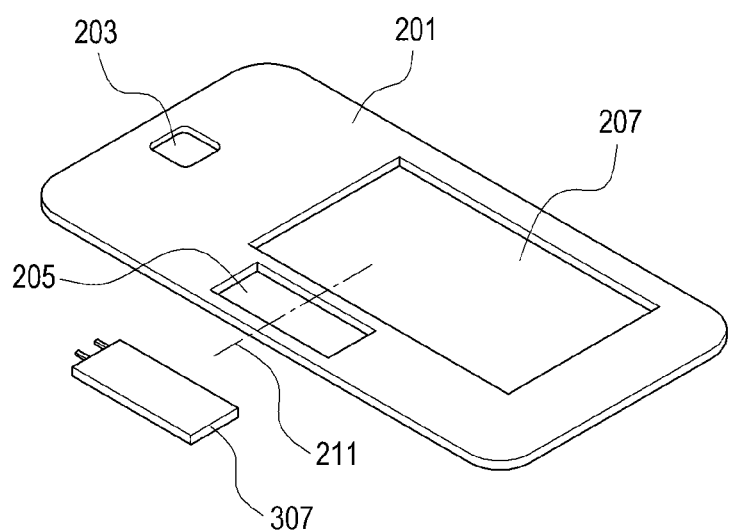
FIGS. 5A to 5F are diagrams illustrating example structures in which an auxiliary battery is mounted to a first frame.

FIGS. 5A to 5F illustrate example structures in which an auxiliary battery may be mounted to a first frame. Referring to FIG. 5A, the first frame 201, the battery mounting hole 205, the camera module mounting hole 203, the main battery reception part 207, and the auxiliary battery 307 are illustrated. The first frame 201 may include the holes 203 and 205 and the main battery reception part 207. The camera module can be inserted into the hole 203. The main battery 309 can be mounted to the main battery reception part 207. The auxiliary battery 307 can be inserted into the hole 205.

Figure 5B:
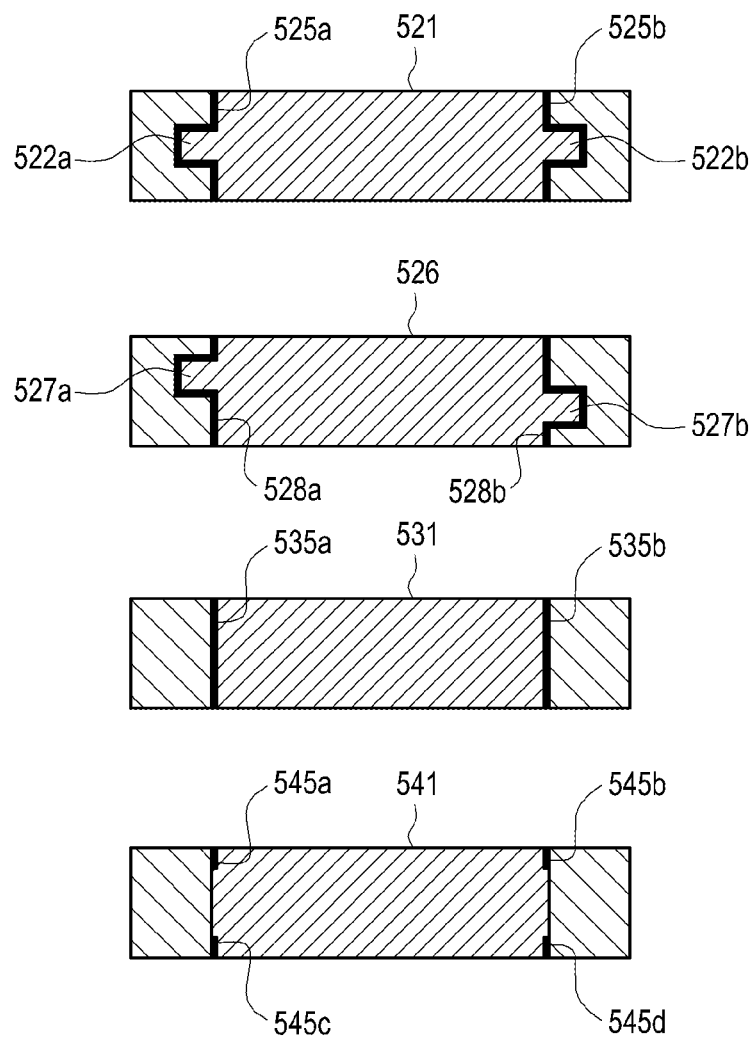

Referring to FIG. 5B, three types of auxiliary battery mounting structures are illustrated. In the first drawing, the auxiliary battery 521 has protrusion parts 522a and 522b formed on opposite side surfaces, and the hole 205 formed in the first frame 201 may include grooves into which the protrusion parts are inserted. The protrusions 522a and 522b may be located at a central portion of the sectional surface. Adhesives 525a and 525b may be applied to a part where the auxiliary battery 521 and the first frame 201 are in contact with each other. In the second drawing, the auxiliary battery 526 has protrusion parts 527a and 527b formed on opposite side surfaces, and the hole 205 formed in the first frame 201 may include grooves into which the protrusion parts are inserted. The protrusion part 527a may be located at an upper left portion of the sectional surface, and the protrusion part 527b may be located at a lower right portion of the sectional section, or vice versa. Adhesives 528a and 528b may be applied to a part where the auxiliary battery 526 and the first frame 201 are in contact with each other.

In the third drawing, the auxiliary battery 531 may be inserted into the hole 205 formed in the first frame 201. Adhesives 535a and 535b may be applied to a part where the auxiliary battery 531 and the first frame 201 are in contact with each other. The auxiliary battery 541 may be inserted into the hole 205 formed in the first frame 201.

In the fourth drawing, adhesives 545a, 545b, 545c, and 545d can be applied to a part where the auxiliary battery 541 and the first frame 201 are in contact with each other. For example, the auxiliary battery 307 can be inserted into the hole 205 formed in the first frame 201, and fixed by adhesive. Accordingly, the auxiliary battery 307 is not separated from the first frame 201 even when a shock is applied from the outside.

Figure 5C:
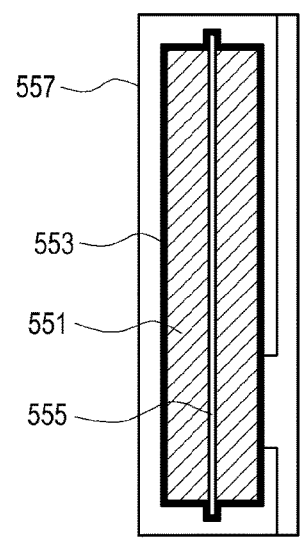

FIG. 5C illustrates an example state in which the auxiliary battery is inserted into the first frame, viewed from above. Referring to FIG. 5C, an auxiliary battery 551, a plate 555, an adhesive 553, and a first frame 557 are illustrated.

One or more plates 555 may be attached to the auxiliary battery 551 or the first frame 557 in order to increase a rigidity of the auxiliary battery 551. The material of the plates 555 may, for example, be metal or plastic, or the like. An adhesive or a laser and ultrasonic waves may, for example, be used to attach the plates 555 to the auxiliary battery 551 or the first frame 557.

Figure 5D:
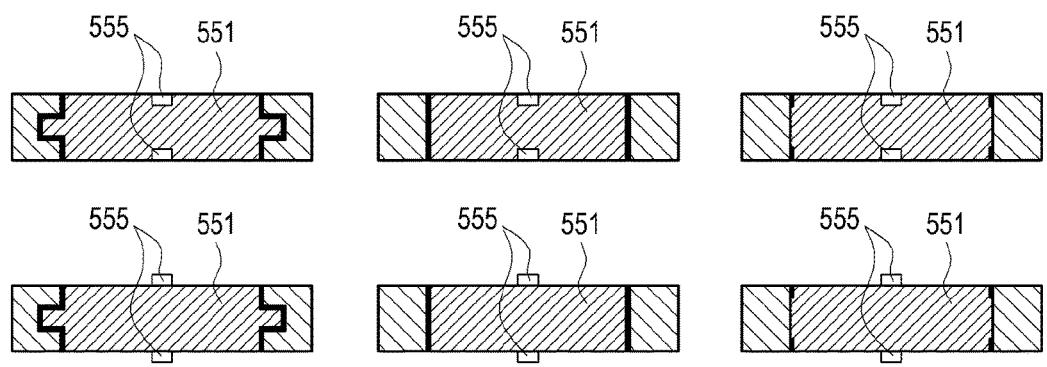

FIG. 5D is a sectional view illustrating a state in which the auxiliary battery is inserted into the first frame. Referring to FIG. 5D, the auxiliary battery 551 and the plates 555 are illustrated. In order to attach the plates 555 to the auxiliary battery 551, grooves may, for example, be arranged at an upper end and a lower end of the auxiliary battery 551, and the plates 555 can be inserted into the grooves. Otherwise, the plates 555 may, for example, be directly attached to the upper end and the lower end of the auxiliary battery 551.

A plurality of battery cells and a plurality of partition walls may be used to increase the rigidity of the auxiliary battery.

Figure 5E:
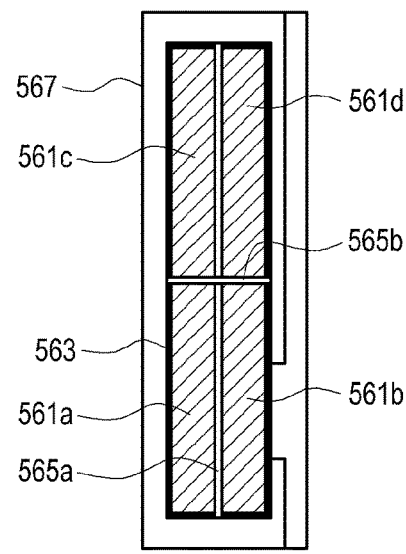

FIG. 5E illustrates a state in which the auxiliary battery is inserted into the first frame, when viewed from above. Referring to FIG. 5E, auxiliary batteries 561a, 561b, 561c, and 561d, plates 565a and 565b, an adhesive 563, and a first frame 567 are illustrated. The auxiliary battery may be configured by a plurality of battery cells 561a, 561b, 561c, and 561d to increase the rigidity thereof, and the plates 565a and 565b may be inserted into spaces between the battery cells 561a, 561b, 561c and 561d to form a partition wall.

Figure 5F:
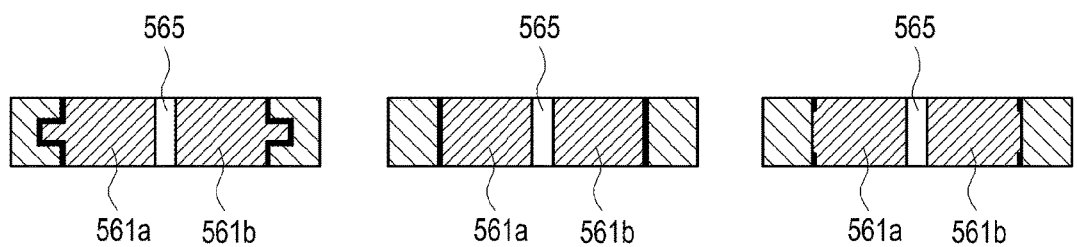

FIG. 5F is a sectional view illustrating an auxiliary battery having a structure of a partition wall. Referring to FIG. 5F, the auxiliary batteries 561a and 561b and the plate 565 are illustrated. The plate 565 may be inserted between the auxiliary battery 561a and the auxiliary battery 561b to form the partition wall.

Figure 6A:
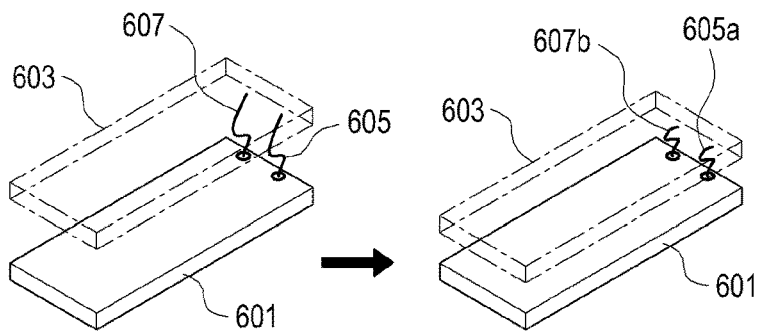
FIGS. 6A to 6C are diagrams illustrating example structures in which a terminal of an auxiliary battery and a PBA are connected to each other.
Figure 6B:
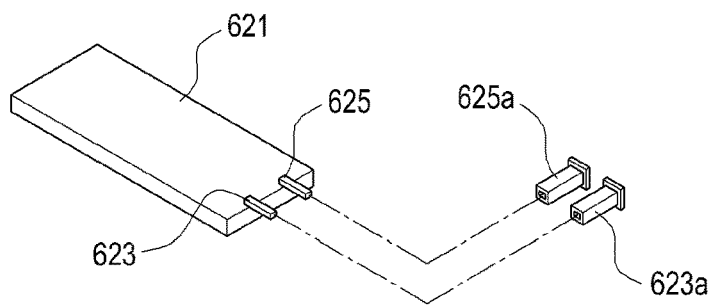
Figure 6C:
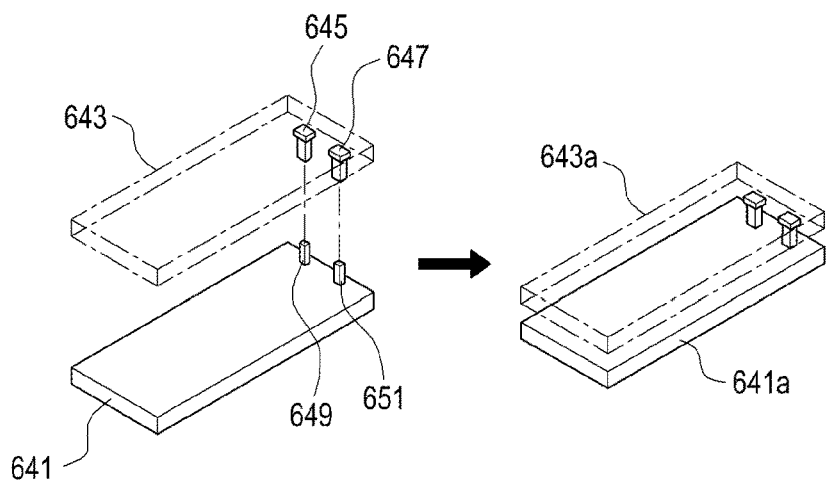

FIGS. 6A to 6C are diagrams illustrating example structures in which a terminal of the auxiliary battery 307 and the PBA 301 are connected to each other.

Referring to FIG. 6A, an auxiliary battery 601, terminals 605, 607, 605a and 607a, and a PBA 603 are illustrated. A part displayed by dot-dash lines corresponds to a part of the PBA 603, which are coupled to the terminal of the auxiliary battery 307. The terminals 605 and 607 may electrically connect the auxiliary battery 601 and the PBA 301 to each other.

The terminals 605 and 607 may be configured by a conductive material having elasticity, and the terminals 605a and 607b can come into close contact with the PBAs 301 and 603 while being contracted when the PBA 603 and the auxiliary battery 307 are coupled to each other.

Referring to FIG. 6B, an auxiliary battery 621, terminals 623 and 625 and sockets 623a and 625a are illustrated. The sockets 623a and 625a are mounted to the PBA 301. When the terminals 623 and 625 of the auxiliary battery 621 are inserted into the sockets 623a and 625a, the auxiliary battery may be electrically connected to the PBA 301.

Referring to FIG. 6C, auxiliary batteries 641 and 641a, terminals 645, 647, 649, and 651, and PBAs 643 and 643a are illustrated. The terminals 645 and 647 may be mounted to the auxiliary battery 641 to be perpendicular to the auxiliary battery 641, and the auxiliary battery 641 and the PBA 643 are electrically connected to each other while the terminals 649 and 651 of the auxiliary battery 641 and the terminals 645 and 647 of the PBA 643 are fitted in each other as the PBA 643 comes into close contact with the auxiliary battery 641 in a state in which the PBA 643 is parallel to the auxiliary battery 641. A right drawing of FIG. 6C illustrates a state in which terminals of the auxiliary battery 641a and the PBA 643 are electrically connected to each other while being fitted in each other.

Figure 7A:
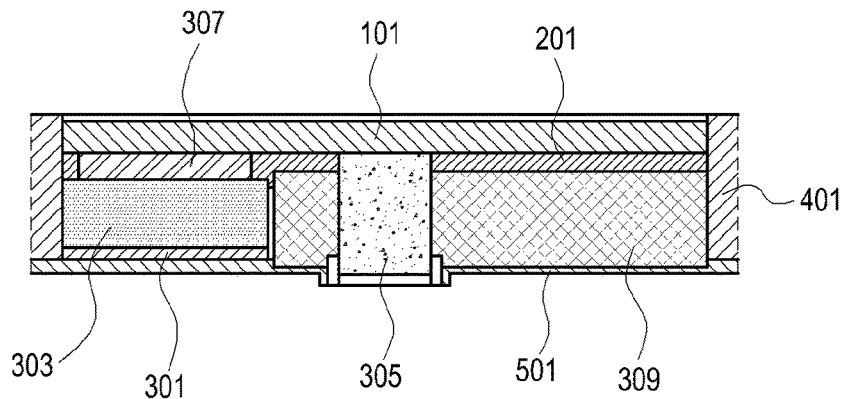
FIGS. 7A to 7D are sectional views illustrating an example state in which a display unit, a first frame, a second frame and a cover are assembled to each other.
Figure 7B:
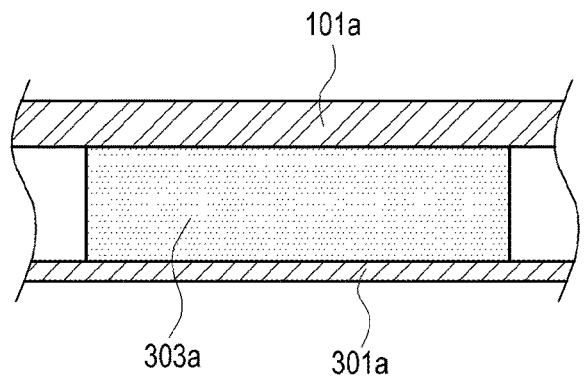
Figure 7C:
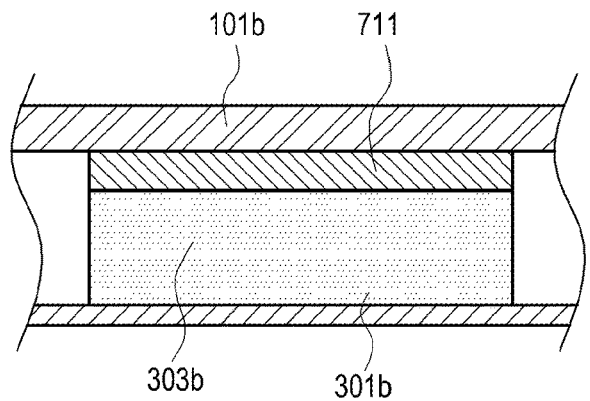

FIGS. 7A to 7C are sectional views illustrating a state in which the display unit 101, the first frame 201, the PBA 301, the second frame 401, and the cover 501 are assembled to each other.

Figure 7D:
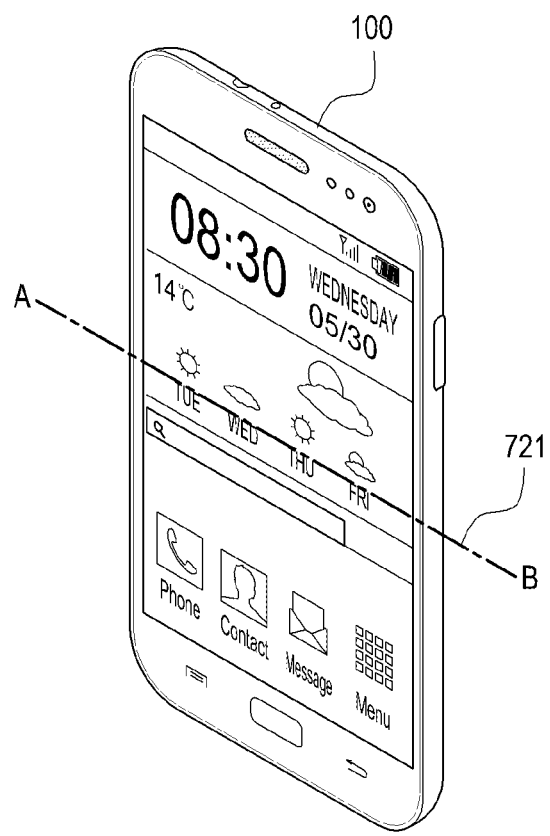

FIG. 7D is a perspective view illustrating a state in which the display unit 101, the first frame 201, the PBA 301, the second frame 401, and the cover 501 are assembled to each other.

Referring to FIG. 7A, a sectional surface obtained by cutting an electronic device of FIG. 7D with reference to a cutting line A-B 721 in a state in which the electronic device is assembled is illustrated. The display unit 101, the first frame 210, the auxiliary battery 307, the main battery 309, the PBA 301, the second frame 401, and the cover 501 are arranged to be parallel to each other. The camera module 305 is not actually shown when the electronic device is cut with reference to the cutting line A-B 721, but is illustrated using a dotted line in order to represent an arrangement location thereof. The first frame 210 may be arranged below the display unit 101. Although not illustrated, the heat dissipation sheet may be arranged between the display unit 101 and the first frame 201. The PBA 301 may be mounted to the first frame 201. The first frame 201 may have a hole into which the auxiliary battery 307 is inserted. The thickness of the auxiliary battery 307 may, for example, be substantially the same as the thickness of the PBA 301. The auxiliary battery 307 may be arranged to be in contact with the processor mounted on the PBA 301. The PBA 301 may include the reception part of the main battery 309, for receiving the main battery 309. The second frame 401 may house the display unit 101, the first frame 201, and the PBA 301. The cover 501 is arranged below the second frame 401, and the second frame 401 may be mechanically coupled to the cover 501. The entire thickness of the electronic device is approximately equal to a value obtained by adding the thickness of the display unit 101, the thickness of the first frame 210, the thickness of the PBA 301, the thickness of the second frame 401, and the thickness of the cover 501. For example, when the thickness of the electronic device is 8.1 mm, it is possible that the thickness of the display unit 101 is 1.8 mm, the thickness of the first frame 201 is 1.0 mm, the thickness of the PBA 301 is 3.8 mm, the thickness of the second frame 401 is 0.8 mm, and the thickness of the cover 501 is 0.7 mm. The auxiliary battery 307 inserted into the hole of the first frame 201 may be mounted to the electronic device without an increase in the thickness thereof when the thickness thereof is substantially the same as the thickness of the first frame 201. When the thickness of the first frame 210 is 1.0 mm, the thickness of the auxiliary battery 307 may be 1.0 mm.

The first frame 201 may perform a heat transfer function in order to draw heat generated by the processor 303 mounted on the PBA 301, to the heat dissipation sheet mounted on the rear surface of the display unit 101. For example, the auxiliary battery 307 inserted into the first frame 201 can transmit the heat generated by the processor 303 to the heat dissipation sheet.

Referring to FIG. 7B, is an enlarged view of a portion of FIG. 7A illustrating an auxiliary battery 101a and the processor 303a in contact with each other. The processor 303a is mounted to the PBA 301a. The auxiliary battery 101a and the processor 303a are in direct contact with each other, and heat generated by the processor 303a may be transmitted to the auxiliary battery 101a. The surface of the auxiliary battery 101a may, for example, be a metal material.

Referring to FIG. 7C, is an enlarged view of a portion of FIG. 7A illustrating a heat transfer material 711 applied between an auxiliary battery 101b and the processor 303b. The processor 303b is mounted to the PBA 301b. Heat generated by the processor 303b may be transmitted to the auxiliary battery 101b through the heat transfer material 711. For example, the heat transfer member 711 may be inserted between the auxiliary battery and the processor in order to efficiently discharge the heat of the processor. The heat transfer material 711 may, for example, be a thermal grease.

Figure 8:
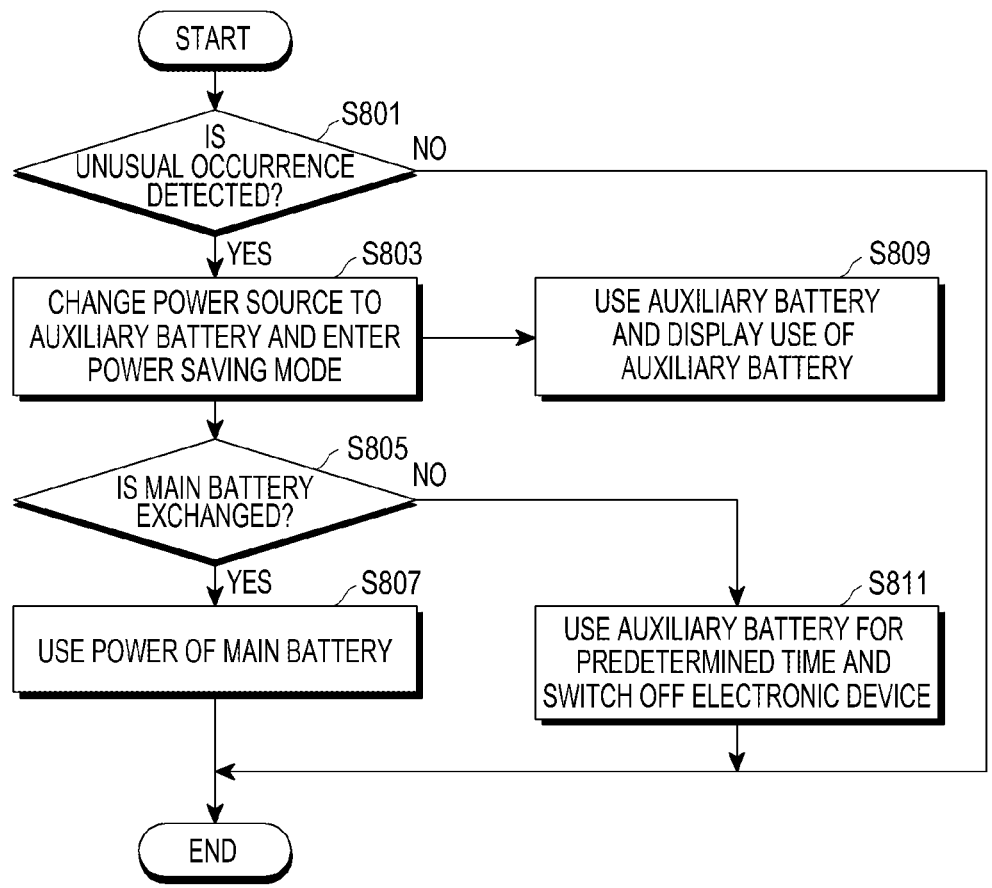
FIG. 8 is a flowchart illustrating an example method of using an auxiliary battery.

FIG. 8 is a flowchart illustrating an example method of using the auxiliary battery 307. The processor 303 may be configured to control the electronic device to receive power from the auxiliary battery 307 when, for example, power supply from the main battery 309 is terminated or when the main battery 309 is separated from the electronic device.

The processor 303 can detect an unusual occurrence in the electronic device based, for example, on a signal output from the sensor unit 311 (step S801). The unusual occurrence may, for example, correspond to a case where the main battery 309 is separated from the electronic device or the voltage of the main battery 309 is rapidly lowered. An unusual occurrence may, for example, correspond to a case where a battery cover is separated or a power source is switched from the main battery to the auxiliary battery. The processor 303 may be configured to control the electronic device to change the power source to the auxiliary battery 307 and enter a power saving mode when an unusual occurrence is detected in the electronic device (step S803). When entering the power saving mode, the processor 303 may be configured to control the display unit 101 to display the UI element displayed on the display unit 101, in, for example, black-and-white. The processor 303 may be configured to display a notification of a use of the auxiliary battery 307 on the display unit 101 when changing the power source to the auxiliary battery 307 (step S809). The processor 303 may be configured to determine if the main battery is exchanged (step S805) and to control the electronic device to receive power from the main battery 309 when the main battery is exchanged and it is determined that the main battery 309 operates normally (step S807). When the main battery 309 is not exchanged, the processor 303 may be configured to control the electronic device to receive power from the auxiliary battery 307 for a predetermined time, and then switch off the electronic device (step S811).

Figure 9D:
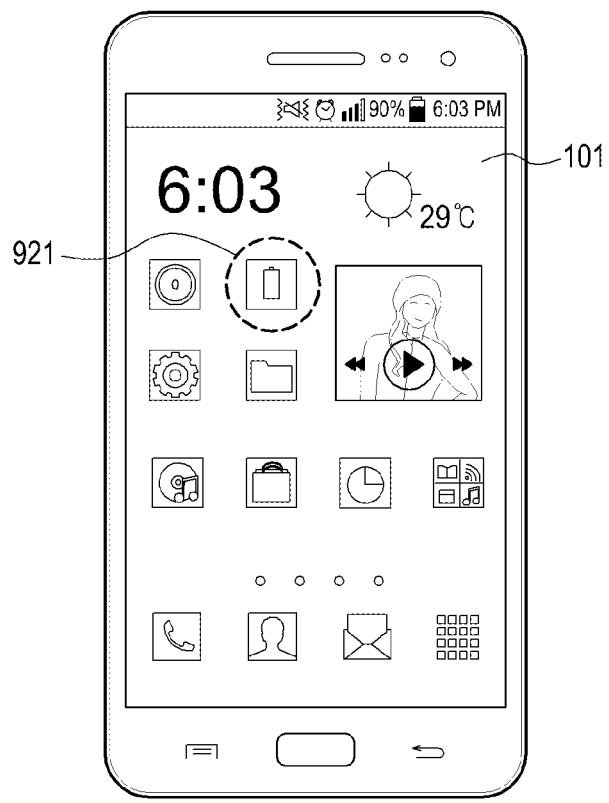

FIGS. 9A to 9D are diagrams illustrating example UI elements displayed on the display unit 101 when the auxiliary battery 307 is used. Referring to FIG. 9A, a UI element displayed on the display unit 101 when the main battery 309 is used is illustrated. When the main battery 309 is used, the UI element can be displayed on the display unit 101 in various colors (as indicated by reference numeral 901). The processor 303 may be configured to control the display unit 101 to display the UI element in various colors when receiving power from the main battery 309.

Referring to FIG. 9B, a UI element displayed on the display unit 101 when the auxiliary battery 307 is used is illustrated. When the auxiliary battery 307 is used, the UI element can be displayed on the display unit 101 in black-and-white (as indicated by reference numeral 903). When the auxiliary battery 307 is used, the UI element can be displayed on the display unit 101 in a low resolution.

When power is supplied from the auxiliary battery 307, the processor may be configured to control the electronic device to operate in a black-and-white mode. When power is supplied from the auxiliary battery 307, the processor 303 may be configured to control the display unit 101 to display the UI element on the display unit 101 in black-and-white.

When power is supplied from the auxiliary battery, the processor may be configured to not execute an application requiring high power consumption. When an application requiring high power consumption is being executed, the processor may be configured to automatically terminate the execution or to request termination from a user.

Before the application requiring high power consumption is executed, the processor may be configured to notify a user that the application cannot be executed, by not displaying the application on an application selection screen or displaying the application in a different color. For example, when the auxiliary battery is used, the processor may be configured to not display the application requiring high power consumption on a screen. Referring to FIG. 9C, an icon 913 of the main battery 309 and an icon 911 of the auxiliary battery 307 are illustrated in a status bar. When the auxiliary battery 307 is used, the processor 303 may be configured to control the electronic device to display the icon 911 of the auxiliary battery 307 in the status bar displayed on the display unit 101.

Referring to FIG. 9D, a UI element for operating the auxiliary battery 307 is illustrated. The processor 303 may be configured to display a UI element 921 corresponding to the auxiliary battery 307 on the display unit 101 to enable a use of the auxiliary battery 307 by a user. The UI element 921 may be an icon or widget for operating the auxiliary battery 307.

The processor 303 may be configured to control the electronic device to interrupt power supply from the main battery 309 and receive power from the auxiliary battery 307, in response to a user input which selects the UI element 921 corresponding to the auxiliary battery 307 displayed on the display unit 101. For example, when a user touches the icon 921 of the auxiliary battery displayed in the display unit 101, the processor 303 may be configured to control the electronic device to supply power from the auxiliary battery 307 to the PBA.

Figure 10:
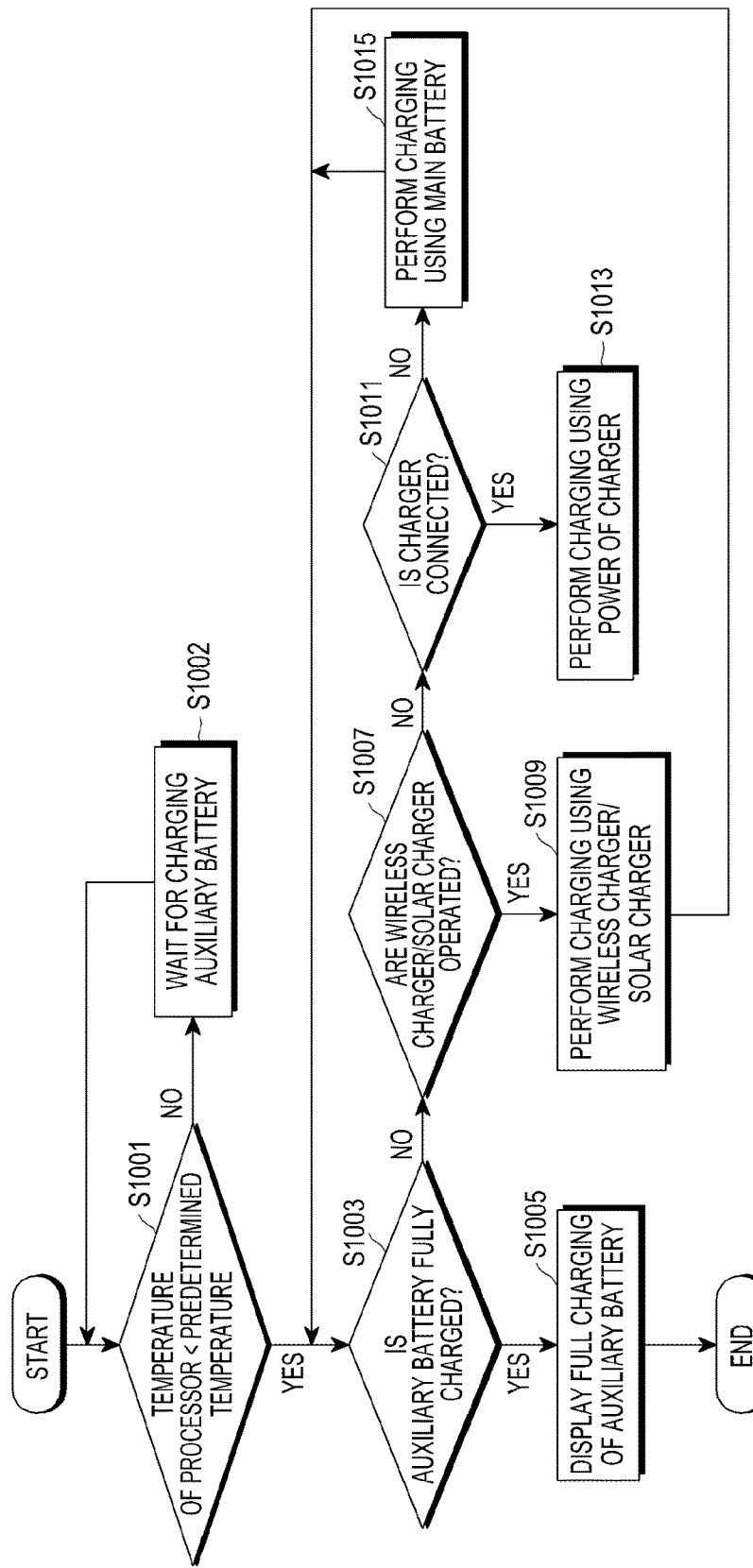
FIG. 10 is a flowchart illustrating an example process of charging an auxiliary battery.

FIG. 10 is a flowchart illustrating an example process of charging an auxiliary battery. The auxiliary battery 307 may, for example, be in contact with the processor 303 directly or indirectly through the heat transfer member, and transmit the heat generated by the processor 303 to the heat dissipation sheet. The temperature of the auxiliary battery 307 may rise while the auxiliary battery 307 receives the heat from the processor 303. Since the temperature may rise while the auxiliary battery 307 is charged, the auxiliary battery 307 may be charged when the temperature of the processor 303 is lower than a predetermined temperature. The processor 303 may include APs and CPs. The electronic device may be configured to provide control such that the auxiliary battery 307 is charged when the temperature of the processor 303 is equal to or lower than a predetermined value. For example, the electronic device may detect the temperature of the processor and determine whether the auxiliary battery 307 is charged on the basis of the temperature of the processor. The electronic device may charge the auxiliary battery when the temperature of the processor 303 is lower than a predetermined value, and may not charge the auxiliary battery when the temperature of the processor is higher than the predetermined value.

Referring to FIG. 10, the electronic device determines whether the temperature of the processor 303 is lower than the predetermined temperature (step S1001). For example, the electronic device may determine whether the temperature of the processor 303 is higher or lower than, for example, 50 degrees Celsius. The electronic device may be configured to provide control such that the auxiliary battery 307 is charged when the temperature of the processor 303 is equal to or lower than a predetermined value. The electronic device may determine whether the auxiliary battery 307 is fully charged (step S1003). When the auxiliary battery 307 is fully charged, the electronic device may display a UI element indicating the full charging of the auxiliary battery 307, on the display unit 101 (step S1005). When the auxiliary battery 307 is not fully charged, the processor may determine whether, for example, a wireless charger and/or a solar charger operates (step S1007), and charge the auxiliary battery 307 using the wireless charger and the solar charger (step S1009). When the wireless charger and/or the solar charger are not operated, the electronic device may determine whether the chargers are connected (step S1011), and charge the auxiliary battery 307 using power of the chargers (step S1013). When the chargers are not connected, the electronic device can charge the auxiliary battery 307 using the main battery 309 (step S1015).

The electronic device may be on standby while not charging the auxiliary battery 307 when the temperature of the processor 303 is larger than the predetermined temperature (step S1002). For example, the electronic device can charge the auxiliary battery 307 on the basis of the temperature. When the auxiliary battery 307 needs to be charged due to a low voltage thereof, the electronic device may charge the auxiliary battery 307 when the temperature of the processor 303 is lower than the predetermined value, and may not charge the auxiliary battery 307 when the temperature of the processor 303 is higher than the predetermined value. For example, when it is determined that the auxiliary battery 307 needs to be charged, the electronic device measures the temperature of the processor 303, and when the temperature of the processor 303 is, for example, 49 degrees Celsius, the processor 303 charges the auxiliary battery 307. When the temperature of the processor 303 is, for example 55 degrees Celsius, the electronic device does not charge the auxiliary battery 307.

Figure 11:
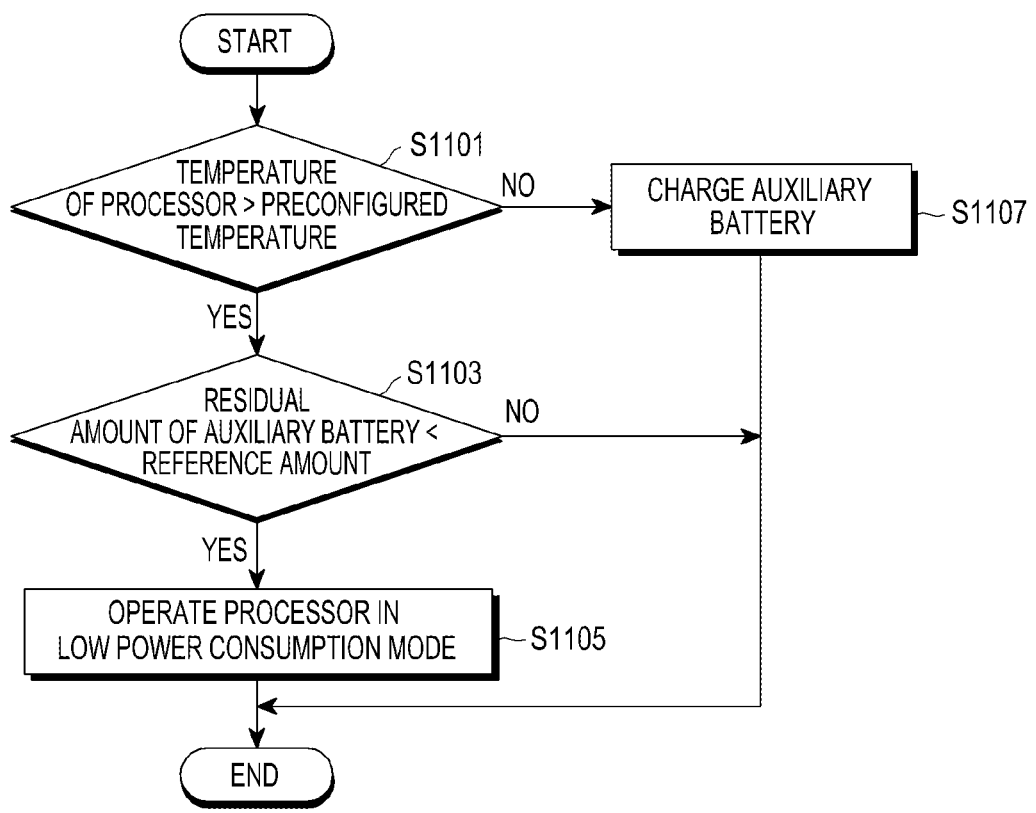
FIG. 11 is a flowchart illustrating an example process of charging an auxiliary battery in consideration of the temperature of a processor.

FIG. 11 is a flowchart illustrating an example process of charging an auxiliary battery in consideration of the temperature of a processor. The electronic device can determine a residual amount of the auxiliary battery and charge the auxiliary battery on the basis of the residual amount of the auxiliary battery. When the residual amount of the auxiliary battery is smaller than a preconfigured value, the electronic device charges the auxiliary battery. For example, when the residual amount of the auxiliary battery is 20%, the electronic device can charge the auxiliary battery. The electronic device checks the temperature of the processor 303 before charging the auxiliary battery. The electronic device determines whether the temperature of the processor is higher than a preconfigured temperature (step S1101). When the temperature of the processor is higher than the preconfigured temperature, the electronic device compares the residual amount of the auxiliary battery with a reference amount (step S1103). The electronic device operates the processor in a low power consumption mode when the residual amount of the auxiliary battery is smaller than the reference amount (step S1105). When the processor operates in the low power consumption mode, the temperature of the processor may drop, and when the temperature of the processor is lower than the preconfigured temperature, the electronic device can charge the auxiliary battery. For example, when the preconfigured temperature is 55 degrees Celsius, the electronic device checks the residual amount of the auxiliary battery when the temperature of the processor is 55 degrees Celsius or higher. The electronic device determines whether the residual amount of the auxiliary battery is equal to or lower than, for example, 10%. When the residual amount of the auxiliary battery is equal to or lower than 10%, the processor operates in the low power consumption mode. The reference amount of the auxiliary battery may be configured by a user or may be preconfigured in the electronic device. The residual amount of the auxiliary battery may be the minimum power at which data in an internal memory of the processor can be stored in a storage unit (not illustrated).

In step S1101, the electronic device charges the auxiliary battery when the temperature of the processor is lower than the preconfigured temperature (step S1107).

An apparatus according to example embodiments of the disclosure may include a processor, a memory for storing and executing program data, a permanent storage unit such as a disc drive, a communication port for communicating with an external electronic device, and a user interface such as a key and a button. Methods implemented by a software module or an algorithm, which are computer-readable codes or program commands which can be executed by the processor, can be stored in a computer-readable recording medium. The computer-readable recording medium may include a magnetic storage medium (e.g., a Read-Only Memory (ROM), a Random-Access Memory (RAM), a floppy disc, and a hard disc), and an optical reading medium (e.g., a CD-ROM and a Digital Versatile Disc). The computer-readable recording medium is distributed into computer systems connected to each other through a network, so that the computer-readable code can be stored and executed in a distribution scheme. The medium can be read by a computer, stored in the memory, and executed by the processor.

An example embodiment of the disclosure may be represented by functional blocks and various process steps. Such functional blocks may be implemented by a plurality of hardware components (e.g., circuitry) and/or software components executing specific functions. For example, integrated circuit components such as a memory, processing, a logic, and a look-up table, which can execute various functions by control of one or more microprocessors or other control apparatuses, can be adopted. Similar to components being executable by software programming or software components, the example embodiment may include various algorithms implemented by a combination of data structures, processes, routines, or other programming components, and can be implemented by a programming or scripting language such as C, C++, Java, and assembler, or the like. Functional aspects may be implemented by an algorithm executed by one or more processors. Further, the examples may adopt the related art in order to perform an electronic setting, signal processing, and/or data processing. The terms "mechanism", "element", "means", and "component" can be widely used, and are not limited to mechanical and physical components. The terms may include the meaning of a series of routines of software associated with a processor.

Specific executions described in an example embodiment of the disclosure are examples, and do not limit a technical range even when using any method. For the conciseness of the disclosure, the description of the conventional electronic components, the control systems, the software, and other functional aspects of the system may be omitted. Further, connections or connection members of lines between components illustrated in the drawings may represent functional connections and/or physical or circuit connections by way of example, and may be represented as alternative or additional various functional connections, physical connections, or circuit connections in an actual apparatus.

In the disclosure (particularly, in claims), use of the term "the" and the indication term similar thereto may correspond to both the singular or the plural. Further, when a range is described, as the range includes an individual value belonging to the range (when there no description contrary thereto), the description of the range is identical to describing each of individual values constituting the range in the detailed description. When a sequence of steps constituting a method is clearly described or there is no description contrary thereto, the steps can be performed in a proper sequence. The sequence is not necessarily limited to a sequence in which the steps are described or listed. Use of all examples or exemplary terms (e.g., "etc.") is simply for describing the technical spirit, and the range thereof is not limited due to the examples or the exemplary terms as long as the examples and the exemplary terms are not limited by claims. Further, those skilled in the art can identify that various modifications, combinations, and changes can be configured according to a design condition and a factor within the range of appended claims and equivalents thereof.

What is claimed is:

1. An electronic device comprising:
   a display configured to display a user interface (UI) element;
   a processor configured to execute an application;
   a Printed Board Assembly (PBA) having the processor mounted thereon and arranged to be parallel with the display;
   a main battery configured to supply power to the electronic device, said main battery being rechargeable;
   an auxiliary battery configured to supply power to the electronic device;
   a first frame configured to house the main battery and the auxiliary battery, and coupled with the PBA, said first frame being arranged to be parallel to the display;
   a second frame configured to fix the display and the first frame; and
   a cover coupled to the second frame, wherein the first frame includes a reception part for housing the main battery and a hole for housing the auxiliary battery at a location corresponding to the processor mounted on the PBA, said auxiliary battery being inserted into the hole,
   wherein the first frame is coupled with the PBA to cause the auxiliary battery mounted in the hole to be in direct contact with the processor mounted on the PBA, and
   wherein the electronic device is configured to receive power from the auxiliary battery when power supply from the main battery is terminated,
   wherein when the main battery is not exchanged, the processor is configured to control the electronic device to receive power from the auxiliary battery for a predetermined time, and then switch off the electronic device.

2. The electronic device of claim 1, wherein the auxiliary battery is coupled to the processor through a heat transfer member.

3. The electronic device of claim 1, wherein a thickness of the auxiliary battery is the same as a thickness of the first frame.

4. The electronic device of claim 1, wherein a thickness of the auxiliary battery is thicker than a thickness of the first frame.

5. The electronic device of claim 4, wherein the electronic device is configured to charge the auxiliary battery based on a temperature of the processor.

6. The electronic device of claim 5, wherein the electronic device is configured to charge the auxiliary battery when the temperature of the processor is lower than a predetermined value, and to not charge the auxiliary battery when the temperature of the processor is higher than the predetermined value.

7. The electronic device of claim 1, wherein the auxiliary battery is rechargeable and is configured to be charged through the main battery and an external power source.

8. The electronic device of claim 1, wherein the electronic device dissipates heat generated by the processor through the auxiliary battery.

9. The electronic device of claim 8, wherein the auxiliary battery includes a surface treatment comprising a material having a high thermal conductivity.

10. The electronic device of claim 1, wherein the electronic device is configured to display the UI element corresponding to the auxiliary battery on the display, and to supply power from the auxiliary battery to the electronic device in response to receiving an input selecting the UI element.

11. The electronic device of claim 1, wherein the electronic device is configured to display the UI element for selecting at least one of the main battery and the auxiliary battery on the display.

12. The electronic device of claim 1, wherein the electronic device is configured to display the UI element on the display providing a notification that the auxiliary battery is in use when the auxiliary battery is used.

13. The electronic device of claim 1, wherein the electronic device is configured to display the UI element on the display in black-and-white when the auxiliary battery is used.

14. The electronic device of claim 1, wherein the electronic device is configured to display the UI element on the display in a low resolution, when the auxiliary battery is used.

15. The electronic device of claim 1, wherein a shape of a hole formed in the first frame is the same as the shape of the auxiliary battery.

16. An electronic device comprising:
    a display configured to display a user interface (UI) element;
    a processor configured to execute an application;
    a Printed Board Assembly (PBA) having the processor mounted thereon and being arranged to be parallel to the display;
    a main battery configured to supply power to the electronic device, said main battery being rechargeable;
    an auxiliary battery configured to supply power to the electronic device;
    a first frame configured to house the main battery, and coupled with the PBA, said first frame being arranged to be parallel to the display;
    a second frame configured to fix the display, the first frame and the PBA; and
    a cover coupled to the second frame, wherein the first frame includes a reception part for housing the main battery,
    wherein the second frame includes a hole for housing the auxiliary battery at a location corresponding to the processor mounted on the PBA, the hole configured to receive said auxiliary battery,
    wherein the second frame is coupled with the PBA to cause the auxiliary battery mounted in the hole to be in direct contact with the processor mounted on the PBA, and
    wherein the electronic device receives power from the auxiliary battery when power supply from the main battery is terminated,
    wherein when the main battery is not exchanged, the processor is configured to control the electronic device to receive power from the auxiliary battery for a predetermined time, and then switch off the electronic device.

17. The electronic device of claim 16, wherein the shape of the hole formed in the second frame is the same as the shape of the auxiliary battery.

18. A method of charging an auxiliary battery of an electronic device comprising a display, a processor, a Printed Board Assembly (PBA), a main battery, an auxiliary battery, a first frame, a second frame, and a cover, the method comprising:
    detecting a temperature of the processor; and determining whether to charge the auxiliary battery based on the temperature of the processor, wherein the first frame includes a reception part for housing the main battery and a hole for housing the auxiliary battery at a location corresponding to the processor mounted on the PBA, said auxiliary battery being inserted into the hole, wherein the first frame is coupled with the PBA to cause the auxiliary battery mounted in the hole to be in direct contact with the processor mounted on the PBA, and wherein the electronic device receives power from the auxiliary battery when power supply from the main battery is terminated, wherein when the main battery is not exchanged, the processor is configured to control the electronic device to receive power from the auxiliary battery for a predetermined time, and then switch off the electronic device.

19. The method of claim 18, wherein the determination includes charging the auxiliary battery when the temperature of the processor is less than a predetermined value, and not charging the auxiliary battery when the temperature of the processor is higher than the predetermined value.

* * * * *